United States Patent Office 3,531,858
Patented Oct. 6, 1970

3,531,858

METHOD OF SIMULTANEOUSLY PRODUCING A MULTIPLICITY OF SEMICONDUCTOR DEVICES

Gerhard Lutz, Erlangen, Germany, assignor to Siemens Aktiengesellschaft, Munich, Germany, a corporation of Germany Filed Sept. 21, 1967, Ser. No. 669,661
Claims priority, application Germany, Sept. 22, 1966, S 106,032
Int. Cl. H01l 1/14
U.S. Cl. 29—591 8 Claims

ABSTRACT OF THE DISCLOSURE

Method of simultaneously producing a multiplicity of semiconductor devices formed of monocrystalline semiconductor members such as of silicon or germanium, for example, includes seating a multiplicity of the semiconductor members spaced from one another a predetermined distance on at least one metallic support strip member, placing end contact members respectively on said semiconductor members, soldering said members to one another, respectively, to form a single unit simultaneously, subjecting all of the semiconductor members assembled on the strip member to further treatment and thereafter severing said strip member at locations intermediate the seated positions of the semiconductor members.

SPECIFICATION

My invention relates to an improved method of simultaneously producing a multiplicity of semiconductor devices formed of monocrystalline semiconductor members, such as of silicon or germanium, of which area rectifiers are an example.

It is an object of my invention to provide a method that achieves an efficient mass production of such semiconductor devices at least to a stage of construction at which the semiconductor components are units or entities that are able to be tested as to their electrical quality. They can then be inserted in special electrical circuits or apparatus, or can be combined into circuit-type mechanical entities or units, if need be, after they have been provided with special connecting leads or wires or bars, or are individually or collectively provided for the formation of the circuit-type entities or units.

My invention accordingly is based on the fact that many method steps which are to be performed on each of the semiconductor members can be carried out collectively for all or a large number of semiconductor members in order to attain an efficient and economical manufacture thereof, such as for example bilateral soldering with support electrodes, etch-treatment, a subsequent spray treatment or similar processes.

Consequently, with the foregoing and other objects in view I provide in accordance with my invention a method of carrying out the just-mentioned objective by seating a multiplicity of semiconductor members mutually spaced from one another a predetermined distance on at least one metallic support strip member, placing end contact members on the semiconductor members, soldering the members, respectively, to one another to form a single entity or unit, subjecting all of the semiconductor members assembled on the strip member to a common treatment, and then severing the strip member at locations between the seated positions of individual semiconductor members.

Figures 1, 2, 3, 4:
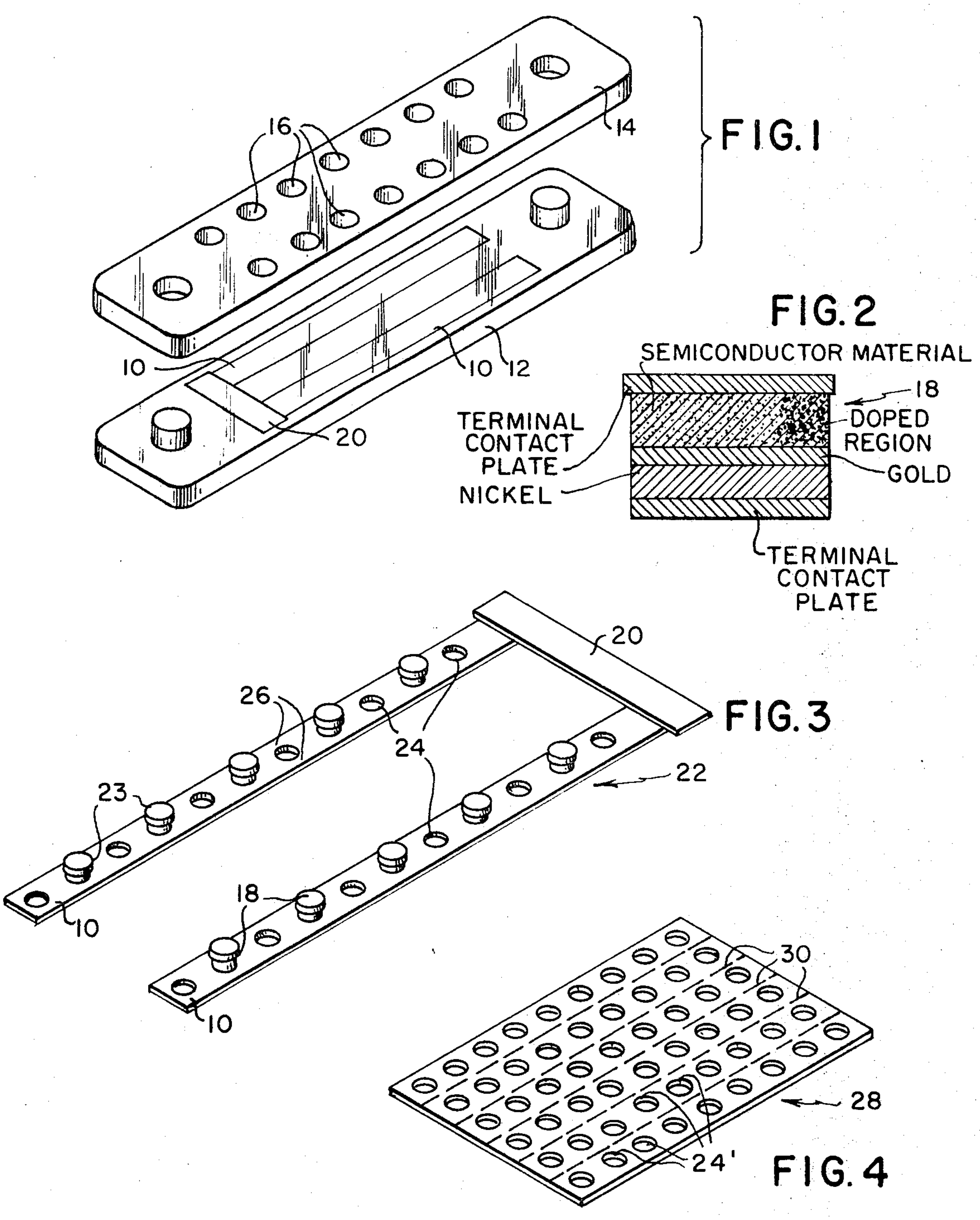
FIG. 1 is a perspective view of a soldering form and pattern used for carrying out the method of my invention.
FIG. 2 is a sectional view of a semiconductor member treated in accordance with the method.
FIG. 3 is a perspective view of strip members to which a plurality of semiconductor members are soldered.
FIG. 4 is a perspective view of a plate for forming support strips according to the method of the invention.

Referring now to the drawing and first particularly to FIG. 1 thereof, there are shown elongated strips 10 made of iron, for example which are inserted in a soldering form 12 for use as support strips. A pattern 14 with suitable recesses 16 provided therein is placed on these iron strips 10. When semiconductor members 18 (FIG. 2), are inserted therein, they assume a predetermined relative position in the recesses in a respective row. The semiconductor elements 18 that are to be inserted can be provided beforehand with doped regions and with electrical end contact surfaces of gold, if necessary on a nickel support layer provided therebelow, and can also have terminal contact plates.

A suitable contact disc, for example, of iron is placed on each of the semiconductor discs. All of the iron portions can be provided beforehand with a respective lead or lead alloy layer on the surfaces thereof in order to be able to effect the bilateral soldering of the iron portion and of the semiconductor elements and to facilitate the soldering. The lead alloying layer serves moreover as resistant coating against an etchant-treatment.

As shown in FIG. 1, in the soldering form 12, below or above the ends of the support strips 10, an additional iron strip 20 can be inserted perpendicularly to the longitudinal direction of the support strips 10. With the completion of the soldering operation between the members disposed in the soldering form 12, a single entity or unit consisting of longitudinal strips 10 and at least one transverse connecting strip 20 is formed therewith at an end thereof, the longitudinal strips supporting semiconductor elements 18 in rows being mutually spaced a specific distance from one another.

The grating-like entity or unit 22 produced in this manner can then be placed successively in various treatment baths, such as an etch bath, a spray bath or a tetriplex bath. The semiconductor devices on the strips 10 can be provided with a protective lacquer coating directly after the bath treatment in order to ensure the electrical stability of the semiconductor members thus produced against the surrounding atmosphere. Then, the longitudinal support strips 10 can be severed between respective seats or locations of the semiconductor members 18, so that, for example, individual semiconductor members or rows of several of such semiconductor members are formed.

To provide contact discs 23 which are applied respectively onto each of the semiconductor members, the support strips 10 between the seating locations of the semiconductor members are also provided with punched holes 24 of such diameter that the punched-out discs can be used for the aforementioned end contact members of the semiconductor elements. Due to this punching process applied to the support strips 10, only longitudinal marginal portions 26 of relatively small area and of slight width in a direction perpendicular to the longitudinal direction of the support strips then remain on the individual mounting strips 10 between the successive seat locations of respective pairs of the semiconductor elements. The support strips 10 are then readily severable for producing the individual semiconductor member unit or a unit made up of groups of semiconductor members.

The method of my invention can also be carried out, starting with a rectangular iron plate 28, as shown in FIG. 4. Recesses 24' are formed in the plate 28 analogously in respective rows, whereby iron discs punched out to form the recesses are again directly produced and can be applied to the individual semiconductor members and soldered thereto. The rectangular plate 28 is then severed along scored dividing lines 30 into the aforementioned support strips 10. On each of the support strips 10, after they are introduced into the solder form 12, and if need be, with the aid of a special pattern 14, there are then disposed semiconductor members mutually spaced apart a suitable distance, and the respective punched-out end contact discs are then placed on each of the semiconductor members. The mutual soldering of the strips 10 and 20, the semiconductor members 18 and their end contact discs 23 is then carried out in the soldering form 12.

As an example, two strips of steel plate 2.5 mm. wide and about 100 mm. long and pre-coated with lead were inserted in the lower portion of a soldering form and were accordingly connected together at one end by placing a smaller strip of lead-coated steel plate thereon.

The upper half of the soldering form, having an arrangement of bores therein spaced 5 mm. from one another, is then locked to the lower half of the form. Silicon members having an area of 1.6 $mm.^2$ and a thickness of 0.4 mm. were then placed in the bores of the upper half of the form so that they overlay the lead-coated steel strips. Lead-coated punched-out discs of steel plate having a diameter of 2.4 mm. were then placed respectively on the silicon members. These discs were formed by punching out holes at 5 mm. intervals in a steel strip 3 mm. wide.

The soldering form is then passed through a once-through heating furnace and subjected to a temperature at which the lead coatings melted.

After emerging from the furnace, 34 rectifier elements joined together were removed from the soldering form. Subsequent etching, lacquering and heating steps were thereafter able to be applied simultaneously to a large number of the elements on the strips. After the heating step, the jointly suspended elements were ground on both sides to have a good contact surface for subsequent mounting. After the grinding operation, the support strips of steel plate were severed into 34 pieces each including one of the rectifier elements, by means of a suitable slicing tool.

Other features which are considered as characteristic for the invention are set forth in the appended claims.

Although the invention is illustrated and described herein as method of simultaneously producing a multiplicity of semiconductor devices, it is nevertheless not intended to be limited to the details shown, since various modifications may be made therein without departing from the spirit of the invention and within the scope and range of equivalents of the claims.

I claim:

1. Method of simultaneously producing a multiplicity of semiconductor devices formed of monocrystalline semiconductor members such as of silicon or germanium, which comprises seating a multiplicity of the semiconductor members spaced from one another a predetermined distance on at least one metallic support strip member, placing end contact members respectively on the semiconductor members, soldering the members to one another, respectively to form a single unit, placing the single unit formed of the mutually soldered semiconductor members, end contact members and support strip member in a given treatment environment so as to simultaneously subject all of the semiconductor members assembled on the strip member to a given further treatment, and severing the strip member at locations intermediate the seated positions of the semiconductor members so as to form a multiplicity of semiconductor devices each comprising a semiconductor member sandwiches between an end contact member and a severed portion of the strip member.

2. Method of simultaneously producing a multiplicity of semiconductor devices formed of monocrystalline semiconductor members such as of silicon or germanium which comprises seating a multiplicity of the semiconductor members spaced from one another a predetermined distance on a plurality of metallic support strip member alongside one another, placing end contact members respectively on the semiconductor members, placing a metallic cross-piece member across the support strip members at least at one end thereof, soldering the members to one another respectively, simultaneously subjecting all of the semiconductor members assembled on the strip members to further treatment, and severing the strip members at locations intermediate the seated positions of the semiconductor members.

3. Method according to claim 1, which includes coating the surface of the strip members with a layer of lead alloy for serving simultaneously as solder and as a protective shield against subsequent etch-treatment.

4. Method according to claim 1, including providing the semiconductor members with electrical end contact surfaces of gold on a supporting layer located therebeneath.

5. Method of simultaneously producing a multiplicity of semiconductor devices formed of monocrystalline semiconductor members such as of silicon or germanium, which comprises seating a multiplicity of the semiconductor members spaced from one another a predetermined distance on at least one metallic support strip member, placing end contact members respectively on the semiconductor members, soldering the members to one another, respectively, to form a single unit, simultaneously subjecting all of the semiconductor members assembled on the strip member to further treatment, severing the strip member at locations intermediate the seated positions of the semiconductor members, and including punching longitudinally spaced holes in the metallic support strip member prior to seating the multiplicity of semiconductor members respectively at locations intermediate the holes, the subsequent severing of the strip member being effected through the marginal portions of the strip member alongside the holes.

6. Method according to claim 5, including placing the punched-out discs of the metallic strip on the semiconductor members, respectively, for serving as end contact discs.

7. Method of simultaneously producing a multiplicity of semiconductor devices formed of monocrystalline semiconductor members such as of silicon or germanium, which comprises seating a multiplicity of the semiconductor members spaced from one another a predetermined distance on at least one metallic support strip member, placing end contact members respectively on the semiconductor members, soldering the members to one another, respectively, to form a single unit, simultaneously subjecting all of the semiconductor members assembled on the strip member to further treatment, and severing the strip member at locations intermediate the seated positions of the semiconductor members, and which includes punching rows of spaced holes in a metal plate serving as a common starting support member so as to form punched-out discs, and subsequently placing the discs as end contact discs on top of the semiconductor members, respectively.

8. Method of simultaneously producing a multiplicity of semiconductor devices formed of monocrystalline semiconductor members such as of silicon or germanium, which comprises seating a multiplicity of the semiconductor members spaced from one another a predetermined distance on at least one metallic support strip member, placing end contact members respectively on the semiconductor members, soldering the members to one another, respectively, to form a single unit, simultaneously subjecting all of the semiconductor members assembled on the strip member to further treatment, and severing the strip member at locations intermediate the seated positions of the semiconductor members, and which includes severing the hole-punched metal plate along substantially parallel dividing lines to form a plurality of the metallic support strip members.

References Cited

UNITED STATES PATENTS

| | | | |
|---|---|---|---|
| 2,994,121 | 8/1961 | Shockley. | |
| 3,080,640 | 3/1963 | Jochems | 29—591 |
| 3,155,936 | 11/1964 | Kelley | 29—591 |
| 3,209,433 | 10/1965 | Moyer et al. | 29—573 |
| 3,264,715 | 8/1966 | Siebertz | 29—591 |
| 3,270,399 | 9/1966 | Ohntrup | 29—577 |

PAUL M. COHEN, Primary Examiner

U.S. Cl. X.R.

29—577, 423